(12) United States Patent
Gieras et al.

(10) Patent No.: US 10,505,411 B2
(45) Date of Patent: Dec. 10, 2019

(54) ELECTRIC MOTORS

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 458 days.

(21) Appl. No.: 15/335,076

(22) Filed: Oct. 26, 2016

(65) Prior Publication Data
US 2018/0115204 A1  Apr. 26, 2018

(51) Int. Cl.
| | | |
|---|---|---|
| *H02K 1/22* | (2006.01) | |
| *H02K 1/14* | (2006.01) | |
| *H02K 1/27* | (2006.01) | |
| *H02K 3/18* | (2006.01) | |
| *H02K 21/14* | (2006.01) | |
| *H02P 1/46* | (2006.01) | |
| *H02P 6/08* | (2016.01) | |
| *H02K 21/04* | (2006.01) | |
| *H02K 21/46* | (2006.01) | |

(Continued)

(52) U.S. Cl.
CPC ............ *H02K 1/223* (2013.01); *H02K 1/146* (2013.01); *H02K 1/2706* (2013.01); *H02K 1/276* (2013.01); *H02K 3/18* (2013.01); *H02K 21/046* (2013.01); *H02K 21/14* (2013.01); *H02P 1/46* (2013.01); *H02P 6/08* (2013.01); *H02K 3/20* (2013.01); *H02K 3/493* (2013.01); *H02K 21/46* (2013.01); *H02K 2213/03* (2013.01)

(58) Field of Classification Search
CPC ...... H02K 1/223; H02K 1/146; H02K 1/2706; H02K 1/276; H02K 3/18; H02K 21/046; H02K 21/14; H02K 3/20; H02K 3/493; H02K 21/46; H02K 2213/03; H02P 1/46; H02P 6/08
USPC ......................................................... 310/68 R
See application file for complete search history.

(56) References Cited

U.S. PATENT DOCUMENTS

| | | |
|---|---|---|
| 3,614,496 A | 10/1971 | Schiethart |
| 7,777,384 B2 | 8/2010 | Gieras et al. |

(Continued)

FOREIGN PATENT DOCUMENTS

| | | |
|---|---|---|
| DE | 1173178 B | 7/1964 |
| EP | 0680131 A2 | 11/1995 |

(Continued)

OTHER PUBLICATIONS

Extended European Search Report received from European Patent Office (EPO) dated Mar. 2, 2018 for Application No. 17197855.4.

(Continued)

*Primary Examiner* — Forrest M Phillips
(74) *Attorney, Agent, or Firm* — Locke Lord LLP; Scott D. Wofsy; Joshua L. Jones

(57) ABSTRACT

An electric motor includes a rotor defining a rotation axis, a plurality of permanent magnets arranged circumferentially about the rotor, a cage winding fixed to rotor radially outward of the permanent magnets. A stator is separated from the rotor by an air gap. A plurality of magnetic flux diverters is arranged circumferentially about the stator and adjacent to the air gap to control a magnetic circuit coupling the rotor and the stator.

12 Claims, 4 Drawing Sheets

(51) Int. Cl.
    *H02K 3/20*    (2006.01)
    *H02K 3/493*   (2006.01)

(56) References Cited

U.S. PATENT DOCUMENTS

| | | | |
|---|---|---|---|
| 7,843,155 B2 | 11/2010 | Rozman et al. | |
| 8,636,241 B2 | 1/2014 | Lugg et al. | |
| 2008/0238235 A1* | 10/2008 | Takahashi | H02K 21/46 |
| | | | 310/156.78 |

FOREIGN PATENT DOCUMENTS

| | | | | |
|---|---|---|---|---|
| EP | 2107664 A2 * | 10/2009 | | H02K 3/20 |
| EP | 2157681 A2 | 2/2010 | | |
| EP | 2814146 A2 | 12/2014 | | |
| JP | 2003111370 A | 4/2003 | | |

OTHER PUBLICATIONS

Clement Pornet and Skin T. Isikveren. Conceptual Design of Hybrid-Electric Transport Aircraft. *Journal of Progress in Aerospace Sciences* 2015, DOI: 10.106/j.paerosci.2015.09.002.

A Future with Hybrid Electric Propulsion Systems: A NASA Perspective. *Turbine Engine Technology Symposium. Strategic Vision Workshop*. Dayton, OH Sep. 11, 2014.

* cited by examiner

ELECTRIC MOTORS

BACKGROUND OF THE INVENTION

1. Field of the Invention

The present disclosure relates to electric motors, and more particularly to electric motors and electric motor arrangements for hybrid-electric aircraft.

2. Description of Related Art

Aircraft commonly employ gas turbine engine-based propulsion architectures, which rely on thrust generated by a gas turbine for propulsion. Recently, hybrid-electric propulsion architectures have received consideration due their potential for reduced emissions and acoustic noise in comparison to gas turbine engine-based propulsion architectures. Hybrid-electric architectures allow for employment the gas turbine engine(s) within a relatively narrow operating, exploiting the flexibility of electric motors to improve engine efficiency.

One challenge to the use of electric motors in hybrid-electric architectures is the need for starting and speed control. Starting and speed control can be using dedicated drives for electric motors employing solid-state inverter. Solid-state inverters enable provision of motor-specific variable voltage variable frequency power sources which cooperate with rotor position sensors, or employ sensorless zero/low speed control regimes to provide starting and speed control.

Such conventional methods and systems have generally been considered satisfactory for their intended purpose. However, there is still a need in the art for improved electric motors. The present disclosure provides a solution for this need.

SUMMARY OF THE INVENTION

An electric motor includes a rotor having plurality of permanent magnets and defining a rotation axis, a cage winding fixed to rotor radially outward of the permanent magnets, a stator, and a plurality of magnetic flux diverters. The stator extends about the rotor and has a power winding. The magnetic flux diverters are distributed about the stator radially between the power winding and an air gap between the rotor and the stator, and are configured to shunt magnetic flux within the stator for starting rotor rotation and controlling rotational speed of the rotor.

In certain embodiments, a variable voltage variable frequency alternating current (AC) power source can be connected to the stator power winding. A direct current (DC) power source can be connected to the magnetic flux diverter control winding. A voltage controller can be connected to the magnetic flux diverters. The voltage controller can have a starting mode, an asynchronous speed mode, and a synchronous speed mode which modulate magnetic communication between the stator and rotor. Current flow to the magnetic flux diverter control windings can be greater in the starting mode than in the synchronous mode. Current flow to the magnetic flux diverter control windings can be greater in the asynchronous rotational speed mode than in the starting mode.

In accordance with certain embodiments, the power winding can be a three phase AC power winding. The cage winding can include two or more conductor rods. The conductor rods can extend axially along the rotor and connect to end rings. The conductor rods can be seated within poles shoes of the rotor. The conductor rods can be disposed radially outward of the permanent magnets. Circumferentially adjacent pairs of conductor rods can be spaced apart from one another by a first spacing and a second spacing. The second spacing can be greater than the first spacing. The conductor rods can be connected in parallel with one another.

It is contemplated that, in accordance with certain embodiments, the stator can include a yoke and stator teeth. The yoke can extend circumferentially about the rotor. The stator teeth can extend radially inward from the yoke. The power winding can be seated between circumferentially adjacent stator teeth. The power winding can be radially adjacent to the yoke. The magnetic flux diverters can be seated radially inward of the power winding. The magnetic flux diverters can seated between circumferentially adjacent stator teeth. The magnetic flux diverters can be radially inward of the power winding.

It is also contemplated that, in accordance with certain embodiment, the magnetic flux diverters can include a magnetic shunt. The magnetic flux diverters can include a control winding. The control winding can be wrapped about the about the magnetic shunt. The control winding can include a conductor with a round or rectangular cross-sectional area. The control winding can include ribbon conductor. The magnetic flux diverters can be connected electrically in series with one another by a control coil.

An electric motor arrangement includes an electric motor as described above, a DC power source, and a variable voltage variable frequency AC power source. The DC power source is connected to the control windings of the magnetic flux diverters. The AC power source is connected to the power winding. A voltage controller operably with a starting mode, an asynchronous rotation mode, and a synchronous rotation mode is operably connected to the DC power source to control current flow to the control winding.

A method of starting an electric motor includes generating a persistent magnetic field about a rotor and generating a rotating magnetic field about the persistent magnetic field. A current flow is induced within the rotor using the rotating magnetic field. The current flow induces a magnetic field in the rotor, thereby exerting a magnetomotive force on the rotor.

A method of controlling rotational speed of an electric motor includes generating a persistent magnetic field about a rotor. A rotating magnetic field of fixed rotational speed is generated about the persistent magnetic field, the persistent magnetic field coupled with the rotating magnetic field, and magnetic flux received through the coupling shunted relative to the rotating magnetic field.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
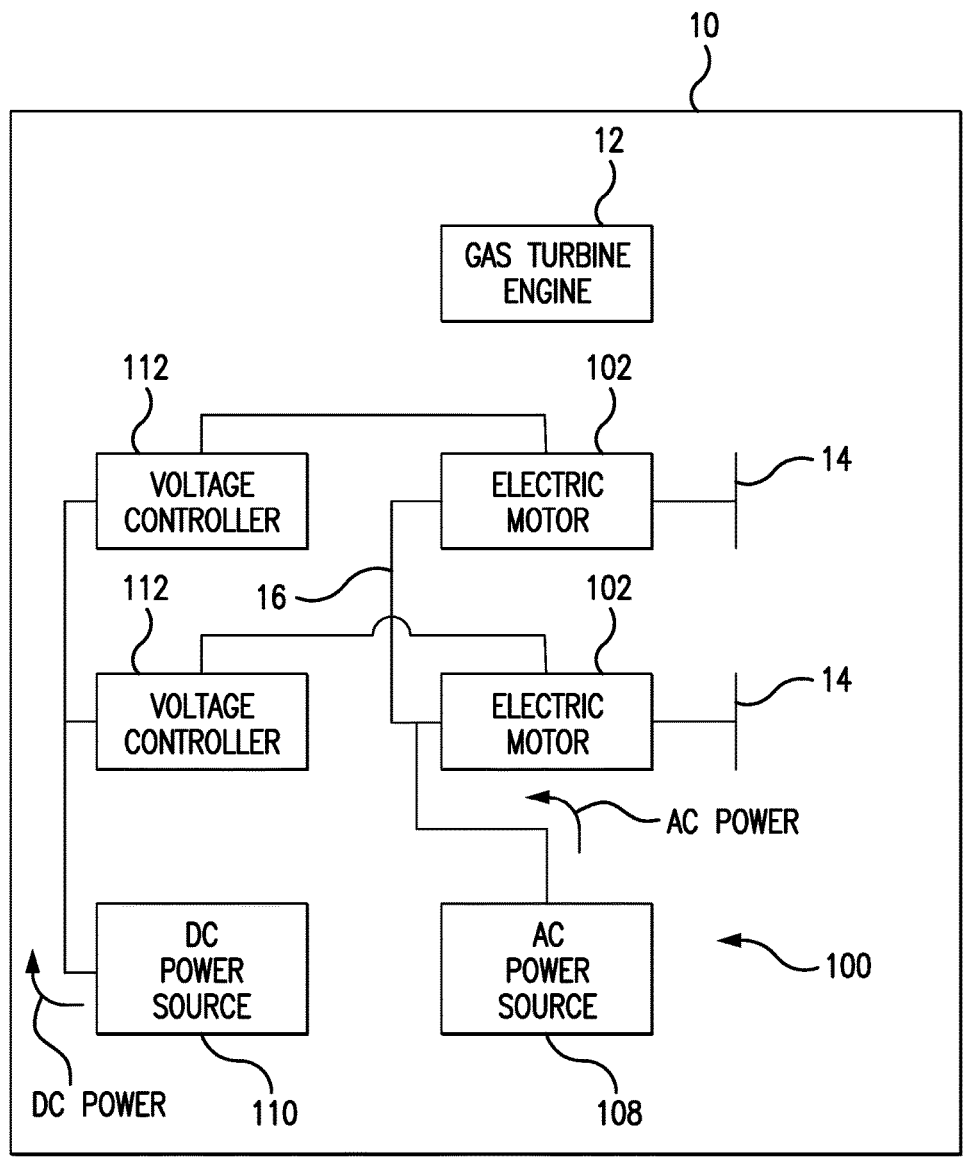
FIG. 1 is a schematic view of an exemplary embodiment of a hybrid-electric aircraft, showing electric motors connected to a single alternating current power source and motor-specific direct current power sources.

Reference will now be made to the drawings wherein like reference numerals identify similar structural features or aspects of the subject disclosure. For purposes of explanation and illustration, and not limitation, a partial view of an exemplary embodiment of an electrical motor arrangement in accordance with the disclosure is shown in FIG. 1 and is designated generally by reference character 100. Other embodiments of electric motor arrangements, electric motors, and related methods of starting and controlling motor speed in accordance with the disclosure, or aspects thereof, are provided in FIGS. 2-5, as will be described. The systems and methods described herein can be used in propulsion systems, such as in hybrid-electric aircraft, though the present disclosure is not limited to aircraft or propulsion systems in general.

Referring to FIG. 1, electric motor arrangement 100 is shown. Electric motor arrangement 100 is carried by an aircraft 10 and includes a plurality of electric motors 102, a variable frequency alternating current (AC) power source 108, a fixed frequency direct current (DC) power source 110, and voltage controllers (or regulators) 112. Each electric motors 102 is operably connected to a respective propulsor 14, receives variable voltage variable frequency AC power from a single AC power bus 16, and is speed-controlled and self-started by motor-specific DC voltage controller 112 to work in concert with a gas turbine engine 12 in a hybrid-electric aircraft propulsion architecture. In the illustrated exemplary embodiment, electric motors 102 are permanent magnet synchronous electric machines that are sensorless, i.e. machines which do not require a rotary position sensor for determining rotor position for purposes of starting and slow-speed operation.

Figure 2:
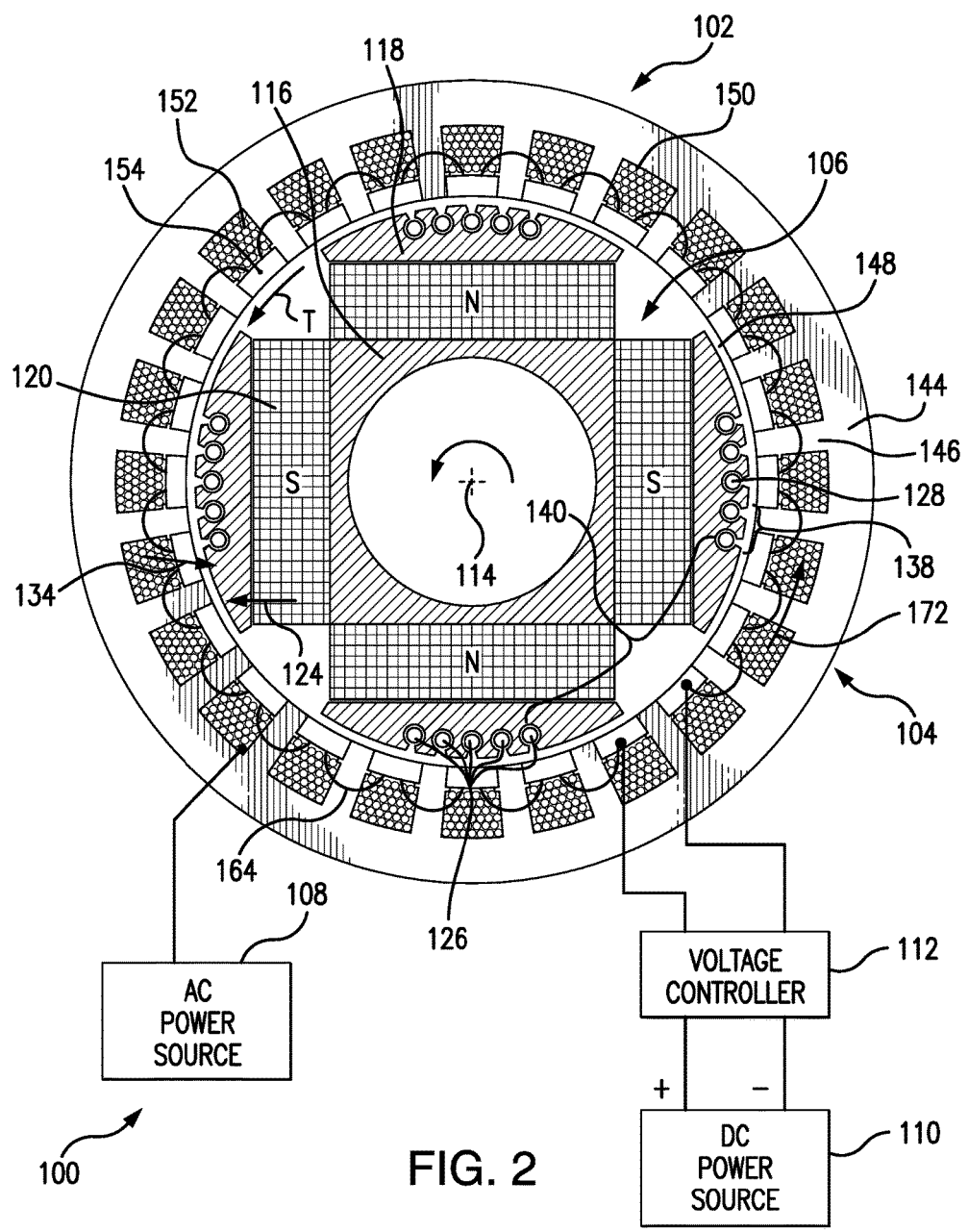
FIG. 2 is a schematic view of an exemplary embodiment of the electric motor illustrated in FIG. 1, showing a rotor and stator, the rotor having a cage winding and the stator having magnetic flux diverters.

Referring to FIG. 2, electric motor 102 is shown. Electric motor 102 generally includes a stator 104 and a rotor 106. Rotor 106 defines a rotation axis 114 and is supported for rotation relative to a stator 104 about rotation axis 114. Stator 104 extends circumferentially about rotor 106 and may be fixed relative to a vehicle, such as aircraft 10 (shown in FIG. 1). Although electric motor 100 is described herein with a radially inner rotor and radially outer stator, it is to be understood and appreciated that electric motors having radially outer rotors can also benefit from the present disclosure.

Stator 104 has a yoke 144, a plurality of stator teeth 146, a power winding 152, and a plurality of magnetic flux diverters 154. Yoke 144 circumferentially surrounds rotor 106. Stator teeth 146 extend radially inward from yoke 144 toward rotor 106. A gap 148 is defined between radial inner ends of stator teeth 146 and rotor 106. Circumferentially adjacent pairs of stator teeth 146 define between one another a plurality of stator slots 150, which are circumferentially distributed about rotor 106. Yoke 144 and stator teeth 146 are formed from a ferromagnetic material, such as iron or steel.

A power winding 152 is seated within stator slots 150. Power winding 152 is electrically connected to AC power source 108 (shown in FIG. 1) and is arranged for generating a rotating magnetic field 134 within stator 104. It is contemplated that the rotational speed of rotating magnetic field 134 varies according to the frequency of AC power applied to power winding 152. Power winding 152 can be a polyphase AC winding to provide an electric motor with high power density. For example, power winding 152 can be a three phase AC power winding, thereby being capable of handling three times the power of a single phase AC power winding while being only 50% larger in size than a single phase AC power winding.

Magnetic flux diverters 154 are circumferentially distributed about stator 104 within respective stator slots 150 and radially inward of power winding 152. Each magnetic flux diverter 154 includes a magnetic shunt 156 (shown in FIG. 3) with a control winding 158 wrapped thereabout. Magnetic shunt 156 is configured and adapted to operate as a magnetic wedge, throttling magnetic coupling between rotor 104 and sate 106 by shunting magnetic flux within the rotor gap current flow through control winding 158. The control windings 158 of each magnetic flux diverter 154 are electrically connected in series with one another to form a control coil 164. Control coil 164 is electrically connected to DC power source 110, which provides a flow of current to control coil 164, and therethrough to control windings 158 of magnetic flux diverter 154. The magnitude of the control current is controllable via voltage regulator 112.

Rotor 106 is separated from stator 104 by gap 148 and includes a pole shoes 118, a cage winding 126, a plurality of permanent magnets 120, and a core 116. Core 116 extends circumferentially about rotation axis 114. Each of the plurality of permanent magnets 120 are arranged radially outward of core 116, are fixed relative to core 116, and are arranged to generate a persistent magnetic field 124. Each pole shoe 118 is arranged radially outward of a respective permanent magnet 120 radially inward of gap 148 and is fixed relative to permanent magnet 120. Pole shoe 118 is formed from a ferromagnetic material, such as iron of steel, which facilitates projection of persistent magnetic field 124 radially outward of pole shoe 118. In the illustrated exemplary embodiment rotor 106 has four (4) pole shoes 118 distributed circumferentially about rotation axis 114. As will be appreciated by those of skill in the art in view of the present disclosure, electric motor 102 can have less four poles shoes or more than four poles shoes, as suitable for an intended application.

Cage winding 126 includes a plurality of conductor rods 128 distributed circumferentially about rotor 106. Conductor rods 128 are seated within pole shoes 118 radially between permanent magnets 120 and gap 148. Each conductor rod 128 extends axially along rotor 104, is formed from an electrical conductor like copper or copper alloy, and is electrically connected in parallel with one another. It is contemplated that conductor rods 128 can be connected at axially opposite ends conductor rods 128, for example, by a conductive ring or plurality of intervening ring segments extending about rotation axis 110.

Circumferentially adjacent pairs of conductor rods 128 are separated by a circumferential first spacing 138 or a second spacing 140. In this respect circumferentially adjacent pairs of conductor rods 128 seated in a common pole shoe 118 are separated by first spacing 138 and circumferentially adjacent pairs of conductor rods 128 seated in separate pole shoes 118 are separated by second spacing 140. Second spacing 140 is greater than first spacing 138. Although shown in the illustrated exemplary embodiment as having five (5) conductor rods 128 seated within each pole shoe 118, it is to be understood and appreciated that electric motor can fewer than five conductor rods or more than five conductors, as suitable for an intended application.

Figure 3:
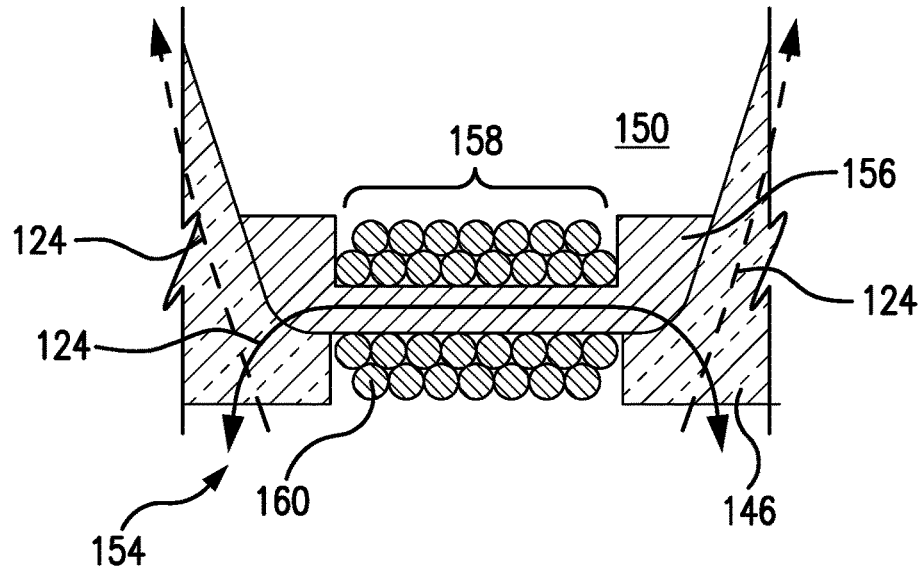
FIG. 3 is a schematic view of an exemplary flux regulator of the electric motor illustrated in FIG. 1, showing an magnetic shunt and a winding coil with a round cross-sectional area wrapped about a magnetic shunt.

With reference to FIG. 3, magnetic flux diverter 154 is shown. Magnetic flux diverter 154 includes a magnetic shunt 156. Magnetic shunt 156 is formed from a material with high permeability, such as ferromagnetic alloys or a sintered magnetic powder, and ordinarily has high magnetic reluctance. Control winding 158 is wrapped about magnetic shunt 156 and is electrically connected to voltage controller 112 (shown in FIG. 2) through control coil 164 to receive a flow of constant frequency current from DC power source 110. In the illustrated exemplary embodiment, control winding 158 has a round cross-sectional area 160, which facilitates packaging magnetic flux diverter within stator slot 150 in a relatively radially compact arrangement.

In operation, control winding 158 is used to generate a flux regulator magnetic field that is localized within stator slot 150 and fixed relative to stator 104. The flux regulator magnetic field cooperates with the material forming magnetic shunt 156 to throttle interaction of persistent magnetic field 124 with rotating magnetic field 134. Changing the extent which the persistent magnetic field 124 interacts with rotating magnetic field 134 allows for control of rotational speed of rotor 104. In particular, by varying a control current applied to control winding 158 the magnetic flux within yoke 144 can be controlled.

For example, when no current is supplied to control winding 158, magnetic shunt 156 reverts to a magnetically unsaturated condition. Being magnetically unsaturated, the magnetic reluctance of magnetic flux diverter 154 becomes low. Low magnetic reluctance causes substantially all magnetic flux from rotor 104 to go through magnetic shunt 156, omitting power winding 152, indicated in FIG. 3 with a solid arrow, and allowing rotational speed of rotor 104 to assume a maximum value.

When current is supplied to control coil 164, current flows through the control winding 158 of each magnetic flux diverter 154. Current flow through the control winding 158 of a given magnetic flux diverter 154 generates a magnetic field localized to the magnetic flux diverter 154, which changes the magnetic shunting performed by the magnetic flux diverter 154. The magnetic field changes the magnetic saturation of the magnetic shunt 156, increasing magnetic reluctance of the magnetic flux diverter 154. This increases the amount of magnetic flux that goes through the magnetic shunt 156, increasing the portion of the magnetic flux which embraces power winding 152, indicated in FIG. with the dashed arrow, which causes rotational speed of rotor 104 to drop.

Conductor bars 128 of cage winding 126 provide starting torque for electric motor 102. As will be appreciated by those of skill in the art, permanent magnet synchronous machines typically are not self-starting motors. In electric motor 102, cage winding 126 provides torque to start rotation of rotor 104. In this respect the conductor bars 128 are formed from an electrically conductive material. Rotating magnetic field (of the stator power winding) 134 induces a flow of electric current through conductor bars 128. The current flow generates a cage winding magnetic field which interacts with rotating magnetic field 134 to exert a start-up torque on rotor 106. It is contemplated that the torque, e.g. starting torque T (shown in FIG. 2), have a magnitude when rotor 106 is stationary relative to stator 104 sufficient for rotor 16 to being rotating relative to stator 104. Once rotation begins the rotor 104 accelerates in rotation in an asynchronous rotational speed mode. As the rotor rotational speed approaches the synchronous speed, it will be pulled out into synchronism, i.e., it will be rotating with the speed of stator magnetic field 134.

Figure 4:
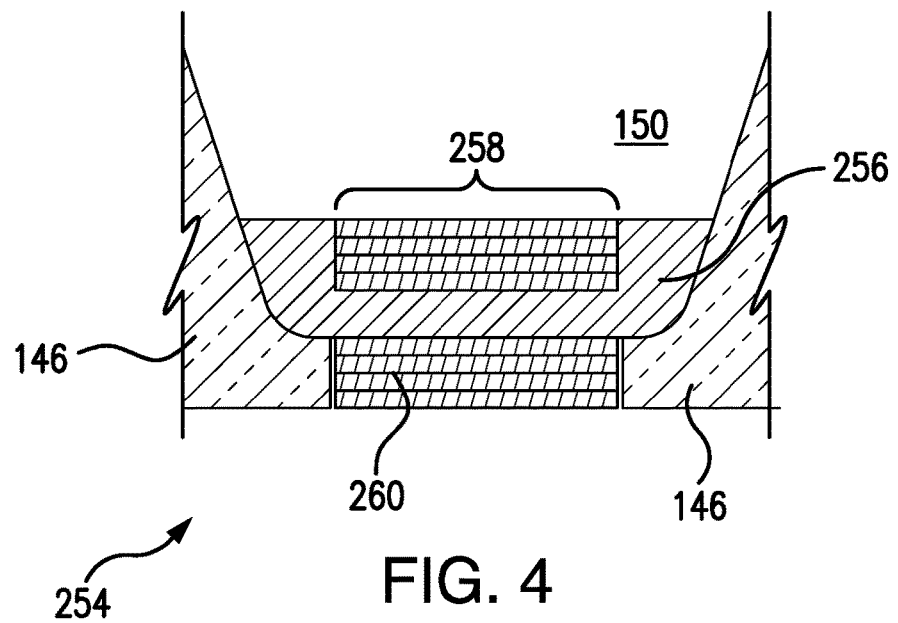
FIG. 4 is a schematic view of another exemplary flux regulator of the electric motor illustrated in FIG. 1, showing ribbon conductor wrapped with a square or rectangular cross-sectional area wrapped about a magnetic shunt.

Referring to FIG. 4, a magnetic flux diverter 254 is shown. Magnetic flux diverter 254 is similar to magnetic flux diverter 154 and additionally includes a ribbon conductor 258. Ribbon conductor 258 is wrapped about a magnetic shunt 256 and has a square or rectangular cross-sectional area 260. Square or rectangular cross-sectional area 260 allows magnetic shunt 256 to be stamped together with stator teeth 146, simplifying fabrication of electric motors incorporating magnetic flux diverter 254. in FIG. 2).

Figure 5:
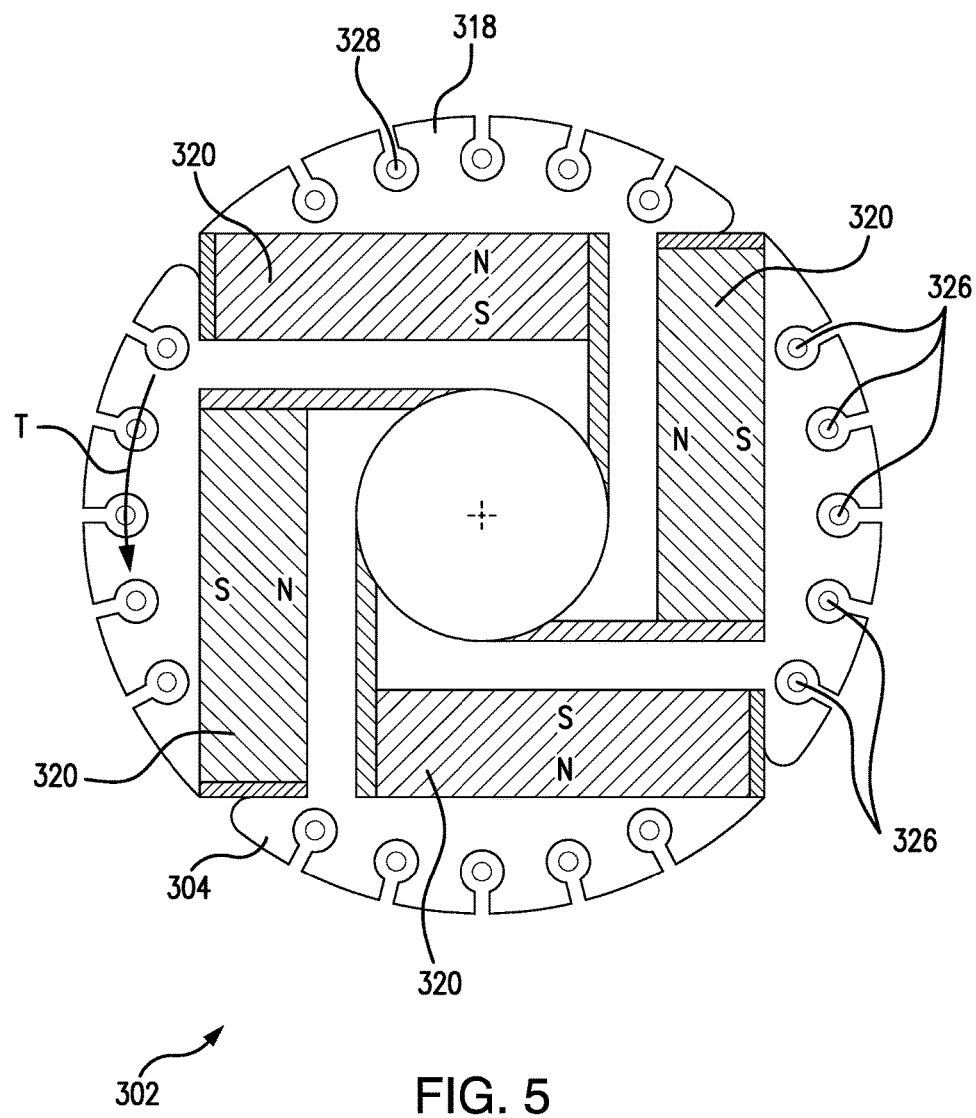
FIG. 5 is a schematic view of another exemplary embodiment of the electric motor illustrated in FIG. 1, showing a rotor with permanent magnets spaced asymmetrically relative to conductor rods of the cage winding.

With reference to FIG. 5, an electric motor 302 is shown. Electric motor 302 is similar to electric motor 102 (shown in FIG. 1), and additionally includes a rotor 304 with a plurality of permanent magnets 320. Each of the plurality of permanent magnets 320 are circumferentially offset from conductor rods 328 and the rotor pole shoes 318. The circumferential offset of each permanent magnet 320 biases a start-up torque T generated by cage winding 326. Biasing start-up torque T by the circumferentially offset of permanent magnets 320 provides a torque profile that decreases with a non-linear function with rotational speed, improving motor efficiency by reducing the effect that the magnetic field in cage winding 126 has on the interaction of the rotating magnetic field with the persistent magnetic fields generated by permanent magnets 320 once rotor 304 has begun rotating.

Electric motors in conventional hybrid-electric architectures are typically supplied power from a solid state inverter power converter. The solid state inverter power converter allows for control of rotational speed of the electric motor by varying the frequency of variable voltage variable frequency AC power supplied to the respective electric motors by a power source. While generally satisfactory for their intended purpose, solid state inverter power controllers can add weight, cost, and/or complexity to the architecture employing such devices.

In embodiments of electric motors described herein electric motors and electric motor arrangements are provided that do not require solid state inverter arrangements. In certain embodiments, the electrical machines with a permanent magnet synchronous machine with magnetic flux diverters and a cage winding. When the electrical machine operates as an electric motor, the cage winding provides self-starting capability and stable operation at fluctuating load, and the magnetic flux diverter provides rotational speed control. In certain embodiments, the stator includes a power winding and control winding operatively connected to magnetic shunts seated between circumferentially adjacent stator teeth. Electric motors and electric motor arrangements described herein can eliminate the need for individual electric motor drives and/or position sensors to control position and rotational speed of the electric motor. Electric motors and electric motor arrangements described herein can provide relatively simply back-electromotive frequency-based sensorless control of synchronous electric motors.

Electric motors and electric motor arrangements as described herein can also be relatively simple, lightweight, efficient, and/or provide reliability to hybrid-electric aircraft propulsion architectures.

The methods and systems of the present disclosure, as described above and shown in the drawings, provide for electric motors with superior properties including self-starting and speed control without a dedicated motor solid-state power converter. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric motor, comprising:
   a rotor having plurality of permanent magnets and defining a rotation axis;
   a cage winding fixed to the rotor radially outward of the permanent magnets;
   a stator separated from the rotor by an air gap and having a power winding;
   a plurality of magnetic flux diverters distributed about the stator radially between the power winding and the air gap,
   wherein the magnetic flux diverters are configured to shunt magnetic flux within the stator; and
   a voltage controller connected to one or more control windings of the magnetic flux diverters.

2. The electric motor as recited in claim 1, further comprising an alternating current power source connected to the power winding.

3. The electric motor as recited in claim 1, further comprising a direct current power source connected to the magnetic flux diverters.

4. The electric motor as recited in claim 1, wherein current flow to the magnetic flux diverters is smaller in a starting mode than in a synchronous rotational speed mode.

5. The electric motor as recited in claim 1, wherein the cage winding includes a plurality of axially extending conductor rods, wherein the conductor rods are connected electrically in parallel with one another, wherein the conductor rods are seated in rotor pole shoes disposed radially outward of the permanent magnets.

6. The electric motor as recited in claim 5, wherein pairs of circumferentially adjacent conductor rods have a first spacing and a second spacing, the second spacing being greater than the first spacing.

7. The electric motor as recited in claim 1, wherein the stator includes a yoke extending about the rotor and a plurality of stator teeth extending radially inward toward the rotor, wherein the power winding is seated circumferentially between adjacent pairs of stator teeth, wherein the magnetic flux diverters are seated between adjacent pairs of stator teeth and radially inward of the power winding.

8. The electric motor as recited in claim 1, wherein one or more of the magnetic flux diverters include magnetic shunt with a control winding extending about the magnetic shunt.

9. The electric motor as recited in claim 8, wherein the control winding includes a conductor with round cross-sectional area or a rectangular cross-sectional area.

10. The electric motor as recited in claim 8, wherein the control winding includes a ribbon conductor with a plurality of conductors disposed therein.

11. An electric motor arrangement, comprising:
    an electric motor as recited in claim 1;
    a direct current (DC) power source connected to the magnetic flux diverters;
    a variable voltage variable frequency alternating current (AC) power source connected to the power winding; and
    a voltage controller operably connected to the DC power source, wherein the voltage controller includes a rotation starting mode, an asynchronous rotational speed mode, and a synchronous rotational speed mode.

12. A method of controlling rotational speed of an electric motor, comprising:
    generating a persistent magnetic field about a rotor;
    generating a rotating magnetic field about the persistent magnetic field, wherein the rotating magnetic field has a fixed rotational speed;
    coupling the persistent magnetic field with the rotating magnetic field; and
    shunting magnetic flux received through the coupling relative to the rotating magnetic field, wherein shunting includes controlling voltage with a voltage controller connected to one or more control windings of the magnetic flux diverters.

* * * * *